(12) United States Patent
Schulz et al.

(10) Patent No.: US 8,253,297 B2
(45) Date of Patent: Aug. 28, 2012

(54) WINDING BODY FOR AN ELECTRIC MOTOR AND METHOD FOR PRODUCING A WINDING BODY FOR AN ELECTRIC MOTOR

(75) Inventors: Martin Schulz, Stuttgart (DE); Hans Rindsbacher, Recherswil (CH); Werner Rieker, Waldenbuch (DE); Gerhard Oberli, Niederbipp (CH); Andre Zschocke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 12/599,550

(22) PCT Filed: May 5, 2008

(86) PCT No.: PCT/EP2008/055463
§ 371 (c)(1),
(2), (4) Date: Nov. 10, 2009

(87) PCT Pub. No.: WO2009/000586
PCT Pub. Date: Dec. 31, 2008

(65) Prior Publication Data
US 2010/0301688 A1  Dec. 2, 2010

(30) Foreign Application Priority Data

Jun. 27, 2007 (DE) .......................... 10 2007 029 741

(51) Int. Cl.
*H02K 3/00* (2006.01)

(52) U.S. Cl. ....................................... 310/208

(58) Field of Classification Search ............ 310/40 MM, 310/43, 50, 216.002–216.004, 208, 266; 29/596, 598
See application file for complete search history.

(56) References Cited

U.S. PATENT DOCUMENTS

| | | | |
|---|---|---|---|
| 4,099,077 A * | 7/1978 | Maekawa ....................... 310/237 |
| 4,287,446 A | 9/1981 | Lill et al. | |
| 4,327,304 A | 4/1982 | Aoki | |
| 4,837,921 A | 6/1989 | Tassinario | |
| 4,954,739 A * | 9/1990 | Schultz et al. ........... 310/156.43 |
| 5,525,850 A | 6/1996 | Stinson | |
| 5,714,828 A * | 2/1998 | Ackermann et al. ... 310/216.002 |
| 5,747,953 A * | 5/1998 | Philipp .......................... 318/139 |
| 6,975,050 B2 * | 12/2005 | Cleanthous et al. ............ 310/50 |
| 2003/0222516 A1 * | 12/2003 | Cleanthous et al. ............ 310/50 |
| 2006/0270326 A1 * | 11/2006 | Lin ............................... 451/356 |

FOREIGN PATENT DOCUMENTS

| | | |
|---|---|---|
| CH | 620 551 | 11/1980 |
| DE | 27 45 502 | 4/1979 |
| DE | 3834 673 | 8/1989 |
| EP | 0 313 514 | 4/1989 |
| FR | 2 831 348 | 4/2003 |
| GB | 2 385 210 | 12/2005 |

(Continued)

*Primary Examiner* — Tran Nguyen
(74) *Attorney, Agent, or Firm* — Michael J. Striker

(57) ABSTRACT

The invention relates to a winding body for an electric motor and, in particular a brushless direct current electric motor (200) with an air gap winding. At least two bobbins (12, 14; 22, 24; 32, 34) per stand (10, 20, 30) are provided. The invention also relates to a method for the production of said winding body. According to the invention, the bobbins (12, 14; 22, 24; 32, 34) of a strand (10; 20; 30) of the winding body (100) are wound immediately behind each other.

13 Claims, 4 Drawing Sheets

FOREIGN PATENT DOCUMENTS

| | | |
|---|---|---|
| JP | 64-8854 | 1/1989 |
| JP | 3-128653 | 5/1991 |
| JP | 6-70522 | 3/1994 |
| JP | 06133520 A * | 5/1994 |
| JP | 2001352704 A * | 12/2001 |
| WO | 2005/112584 | 12/2005 |

* cited by examiner

WINDING BODY FOR AN ELECTRIC MOTOR AND METHOD FOR PRODUCING A WINDING BODY FOR AN ELECTRIC MOTOR

CROSS-REFERENCE

The invention described and claimed hereinbelow is also described in PCT/EP2008/055463, filed on May 5, 2008 and DE 10 2007 029 741.8, filed on Jun. 27, 2007. This German Patent Application, whose subject matter is incorporated here by reference, provides the basis for a claim of priority of invention under 35 U.S.C. 119 (a)-(d).

BACKGROUND OF THE INVENTION

The present invention relates to a winding body for an electric motor and a method for producing a winding body for an electric motor.

Brushless direct current motors (BLDC motors) comprising an air-gap winding and coreless winding bodies are known. Typically, the winding for a winding body of this type is first placed on a mandrel which holds the coils in position during the winding process. Next, the winding, which is typically composed of thermoset varnished wire, is brought into its final shape via heating and pressing; the winding body retains this final shape after it is heated. Finally, the winding body is removed from the mandrel, and it may be further processed.

Three separate litz wires are used to manufacture a three-phase, two-pole winding, thereby greatly complicating handling which would require an unjustifiable amount of effort to automate. The winding bodies of BLDC motors of this type that include an air-gap winding are typically manufactured by hand. For this reason, BLDC motors of this type that include an air-gap winding are used only for applications that only require small quantities, such as in the model-making industry.

SUMMARY OF THE INVENTION

The present invention relates to a winding body for an electric motor, in particular for a brushless direct current electric motor that includes an air-gap winding, in the case of which at least two coils per winding phase are provided.

It is provided that the coils of a winding phase of the winding body are wound directly one after the other. A winding phase is the connection between two terminals of the winding, and it is composed of at least two coils which are also referred to as coil sections. Each of the coil sections is assigned to another pole of the electric motor. The coils are typically wound using litz wire which is composed of several individual wires. Advantageously, the winding process may be automated since the coils of a winding phase are wound in succession. The coils of all winding phases may be wound continuously using a single litz wire which is not cut until the winding process is complete.

Favorably, the winding body may be designed in the shape of a pot. Preferably, the winding body may include, on one axial end, a winding overhang which is located radially outwardly. Likewise, the winding body may include, on one axial end, a winding overhang which is located radially inwardly. As a result, valuable installation space may be attained in both cases. If the outwardly located winding overhang is provided at one end in the form of a ridge-like expansion, and the inwardly located overhang is provided at the other end in the form of a base that is open toward the inside, the winding overhang may be shortened at both ends, thereby increasing the amount of installation space available.

The present invention also relates to a method for manufacturing a winding body for an electric motor, in particular for a brushless direct current electric motor that includes an air-gap winding, in the case of which at least two coils per winding phase are provided.

It is provided that the coils of one winding phase are wound in succession before coils of another winding phase are wound. The winding of the winding body is designed as a continuous series connection. As a result, it is possible to automate the manufacture of the winding body. It is no longer necessary to perform winding manually. The winding body is composed, e.g., of six coils, with two coils per winding phase, and three phases. The winding of the winding body is composed of fewer windings depending on the rotational speed of the electric motor that is desired, and depending on the supply voltage. Since the coils of a winding phase are wound in succession, it is not necessary to fix ends of coils of two different winding phases during the winding process. In the case of the known winding bodies, winding is carried out in this order: the first coil of the first winding phase, followed by the first coil of the second winding phase, the first coil of the third winding phase, the second coil of the first winding phase, etc. This known winding sequence assumes that winding is carried out using three litz wires, i.e., one litz wire per winding phase.

To attain a high space factor, and to ensure that winding may be carried out well in terms of a minimal number of possible radii, winding is carried out in parallel, i.e., winding is carried out using several wires simultaneously. To ensure that manufacture may be automated, the winding technique that is used is to preferably design the winding as a continuous series connection. Preferably, the coils of one winding phase may be wound directly one after the other.

The winding wires may be designed as thermoset varnished wires. The coils of the winding body are wound on a coil former which is removed after winding has been completed. To reduce the overall length, a winding overhang is formed that forms a radially outwardly folded edge; on the opposite side, the edge is folded radially inwardly, thereby forming a base that is open in the center. Finally, the winding or winding body is baked into a solid mass. A wrapper material that is preferably a coreless sleeve composed of insulating sheeting is placed over the winding body. The insulated winding body is inserted into the stator core which is composed of segmental rings stacked on top of one another in the axial direction. The stator may be fixed by designing the wrapper material as thermoset varnished paper or via trickling with impregnating resin. Impregnation has the advantages that it secures the winding mechanically against rotation by the motor torque that is generated, and it improves the heat dissipation of the winding, thereby increasing the nominal power and improving the overload capability, thereby increasing the robustness of the motor.

The entire winding of the winding body may be manufactured using a single litz wire which remains continuous when it transitions from one coil of one winding phase to the next coil of the next winding phase, and for creating the connections for the motor, the litz wire is not cut until after the winding is completed. Advantageously, a litz wire composed of several individual wires is used, so that winding may be carried out in parallel. Since winding is carried out in parallel, it is sufficient to use only a few different wire diameters in production, e.g., a number of different diameters that corresponds to the number of variants of a certain motor size.

Favorably, it is possible to guide ends of the coils out of the winding as loops during the winding process, while coil ends in the related art are formed by exposed litz-wire ends that must be fixed in position and clearly marked to prevent confusing the connections when they are subsequently connected. By extending the loops to the outside, which is preferred, the risk of confusing the coil ends is reduced.

Preferably, the loops may be cut after winding is complete. Given that the loops are not cut until a point in time that is close to the instant when the electrical connections of the coils are created, it remains clear to the operator which coil ends belong to which.

An electric motor is provided that includes a winding body that is manufactured in accordance with at least one feature of the method described above. The electric motor which, in particular, is an electrically commutating motor that includes an air-gap winding, in particular a BLDG motor that includes an air-gap winding, has a number of advantages over a BLDC motor that includes a slotted stator and a DC motor. It is possible to attain high rotational speeds of up to 50,000 rpms and higher, up to the load limit of a gearbox that is coupled to the motor. The core losses are minimal at high rpms. Due to its design, the motor has low inductance; high inductances result in lower effective currents as rotational speeds increase, and increasing inductance results in greater switching losses in the electronics. Due to its low core and copper losses, the BLDC motor that includes an air-gap winding attains a high maximum efficiency. Due to the low-resistance winding, optimal efficiency is attained across nearly the entire working range. The type of winding enables a high "slot fill factor" to be attained, thereby resulting in a high power density and making it possible to carry out a relatively fine adjustment of the desired rotational speed. Due to the method by which the winding is manufactured, the motor is particularly well-suited for use in a range of stator diameters from approximately 20 mm to over 40 mm. Furthermore, only a relatively small investment is required in order to manufacture large quantities in a semi-automated manner. It is also advantageous that, due to the continued development of rechargeable-battery technology and, therefore, lower internal resistances of rechargeable batteries, advantages of the BLDC motor comprising an air-gap winding are overproportionally greater than those of the BLDC motor that includes a slotted stator.

It is preferable to use an electric motor—in particular an electronically commutating electric motor that includes an air-gap winding, in the case of which a winding body is located in an air gap between a stator iron core and a rotor—for a power tool, in particular a power tool that includes an insertion tool that is drivable in a percussive and/or rotary manner, in particular a power tool that is operated using a rechargeable battery.

Known electric motors comprising an air-gap winding are incapable of being automated due to the presence of the winding body, and are therefore unusable in series production. Due to advancements made in rechargeable-battery technology, power tools that are powered using rechargeable batteries are becoming more significant than mains-operated devices. Substantially more applications are being covered using rechargeable-battery operated products, and the output of the drives is increasing; the efficiency of the drive is becoming more significant, and the limits of the conventional DC motor using permanent-magnet excitation are being reached in many applications. Examples of products that are affected include screwdrivers, drills, impact drills, and rotary hammers, each of which is in the top performance class. By comparison, angle grinders and circular saws are even higher in terms of performance requirements. Disadvantages of the DC motor using permanent-motor excitation are, e.g., that the rotational speed is limited in terms of the requirements of the application. The reasons are, inter alia, due to the commutation and the risk of demagnetization taking place when the motor is started up. The working point is usually located in the range of markedly reduced efficiency. The heat losses from the armature are difficult to dissipate. Dissipation heat that occurs on the commutation device results in decreases in reliability. Product-specific mechanical reactions influence the commutation and result in a reduced service life.

In contrast, the electric motor that is provided allows the rotational speed to be increased to twice that of a DC motor having the same output. The power density of existing applications may be doubled, or a motor having half as much volume is required for the same output. The weight may be reduced accordingly. Any additional electronics that are required may be installed at a different point that does not affect the overall volume of the device. The efficiency may be held at a high level across nearly the entire relevant working range, and, at the optimum, is greater than it is with a comparable DC motor. Due to the good efficiency, less dissipation heat is produced that would have to be released. Although the performance requirements are higher, it is possible to avoid problems related to service life and reliability since the electric motor and, therefore, the power tool are particularly robust and reliable, and they have a long service life. The influence of effects that are dependent on operating temperature, and product-specific mechanical reactions to the functionality of the power tool are advantageously diminished.

A power tool is provided, in particular a power tool that includes an insertion tool that is driveable in a percussive and/or rotary manner, and that includes an electric motor comprising an air-gap winding, in particular an electronically commutating electric motor, in the case of which a winding body is located in an air gap between a stator iron core and a rotor. Due to the high rotational speeds that are attainable due the design, and due to the low inductance that is attainable due to the design, the high quality electric motor has properties that are superior to those of other electric motors such as BLDC motors that include a slotted stator, or DC motors that use permanent-magnet excitation. The preferred power tool is correspondingly robust and reliable.

Preferably, the coils of one winding phase of the winding body may be wound in succession before coils of another winding phase are wound. The winding of the winding body is designed as a continuous series connection.

The power tool is preferably a hand-held power tool. Furthermore, the hand-held power tool is preferably operated using a rechargeable battery.

BRIEF DESCRIPTION OF THE DRAWINGS

Further advantages result from the description of the drawing that follows. An exemplary embodiment of the present invention is shown in the drawing. The drawing, the description, and the claims contain numerous features in combination. One skilled in the art will also advantageously consider the features individually and combine them to form further reasonable combinations.

DETAILED DESCRIPTION OF THE PREFERRED EMBODIMENTS

Figure 1:
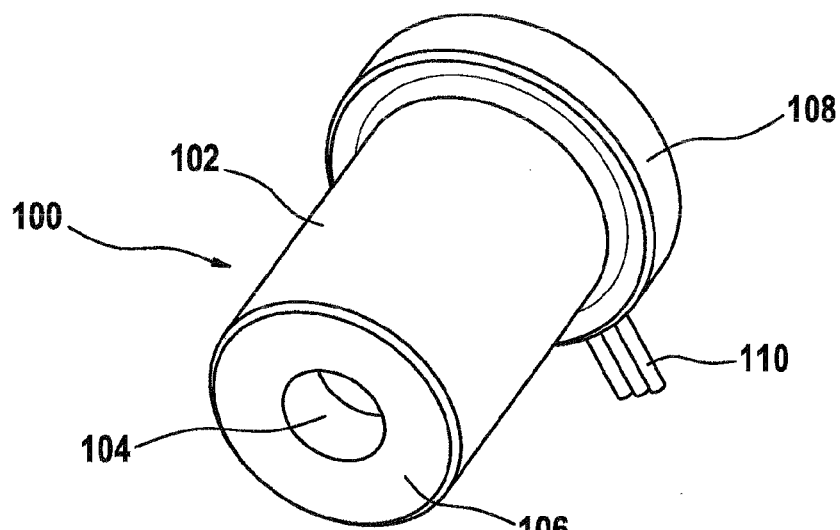
FIG. 1 shows a preferred winding body.

Elements that are the same or similar-acting are labelled using the same reference numerals in the figures.

FIG. 1 shows a preferred winding body 100 for an electric motor, which is designed, e.g., as an electronically commutating, brushless direct current electric motor (BLDC motor) that includes an air-gap winding. The winding body is self supporting in design and is shaped roughly as a pot having a cylindrical section 102, an inwardly pointing winding overhang 106 on one end which forms a base which is open in the center, and an outwardly folded winding overhang 108 which forms a ridge-like edge on the other end of winding body 100. Current may be supplied to the winding body during operation via an electrical contact 110. In the installed state, a rotor of the electric motor is located in interior 104 of winding body 100; the rotor shaft of the rotor extends out of both ends of winding body 100.

Figure 2:
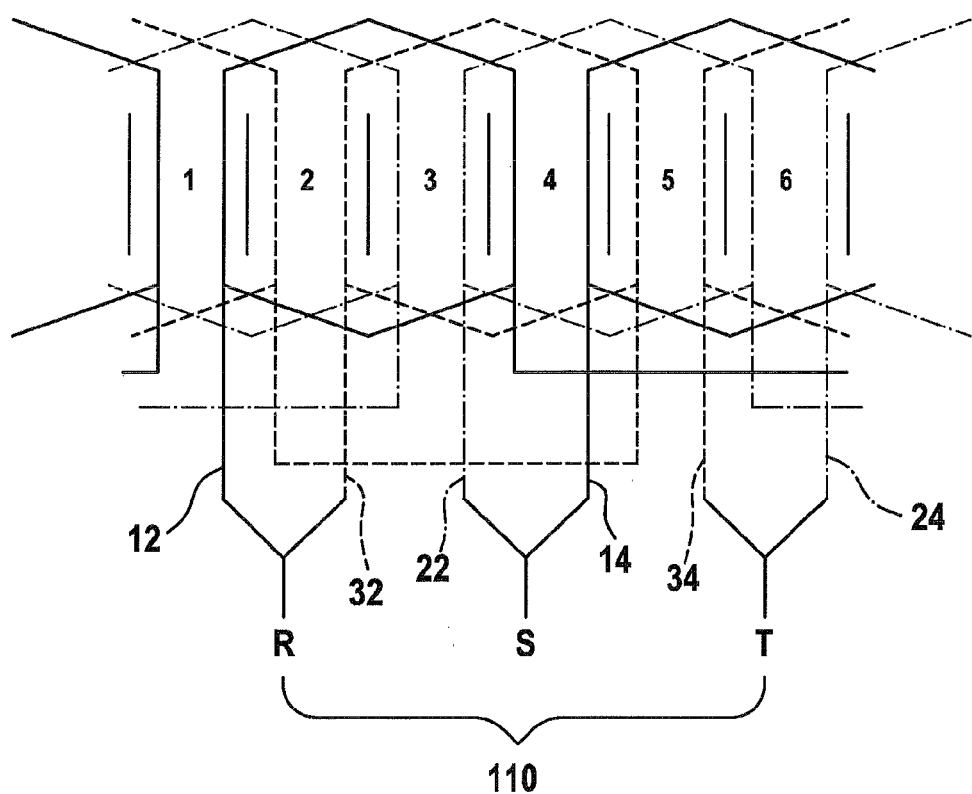
FIG. 2 shows a winding scheme for a winding body having 6 coils, 2 poles, and 3 winding phases.

FIG. 2 shows a winding scheme of the type used for a three-phase, two-pole winding of an electric motor.

In the case of a three-phase, two-pole winding, the following are provided: two coils 12, 14 for a first winding phase 10, two coils 22, 24 for a second winding phase 20, and two coils 32, 34 for a third winding phase 30, i.e., a total of six coils 12, 14, 22, 24, 32, 34 which are interconnected in the manner shown. At every winding phase 10, 20, 30, an electrical phase R, S, T is set up to receive current during operation.

Figure 3A:
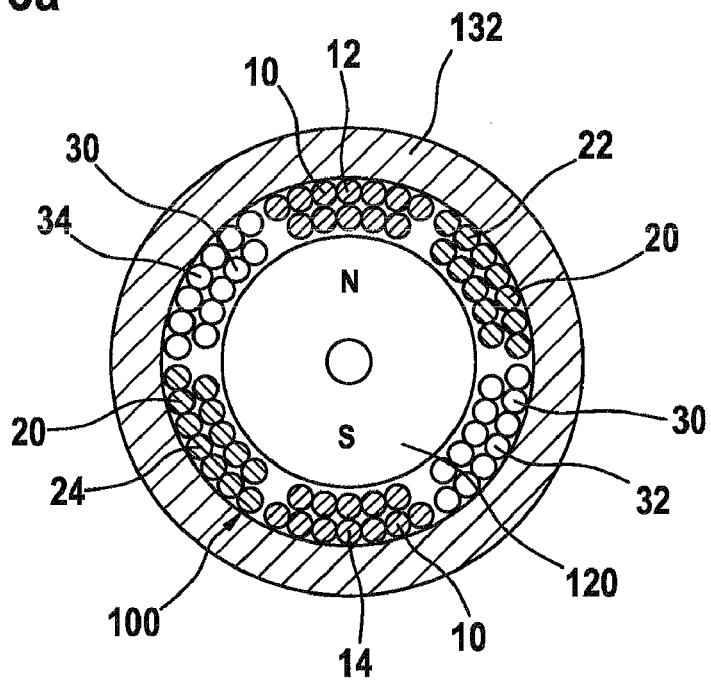
FIG. 3a shows a cross section through a winding body, with the position of the coils indicated.
Figure 3B:
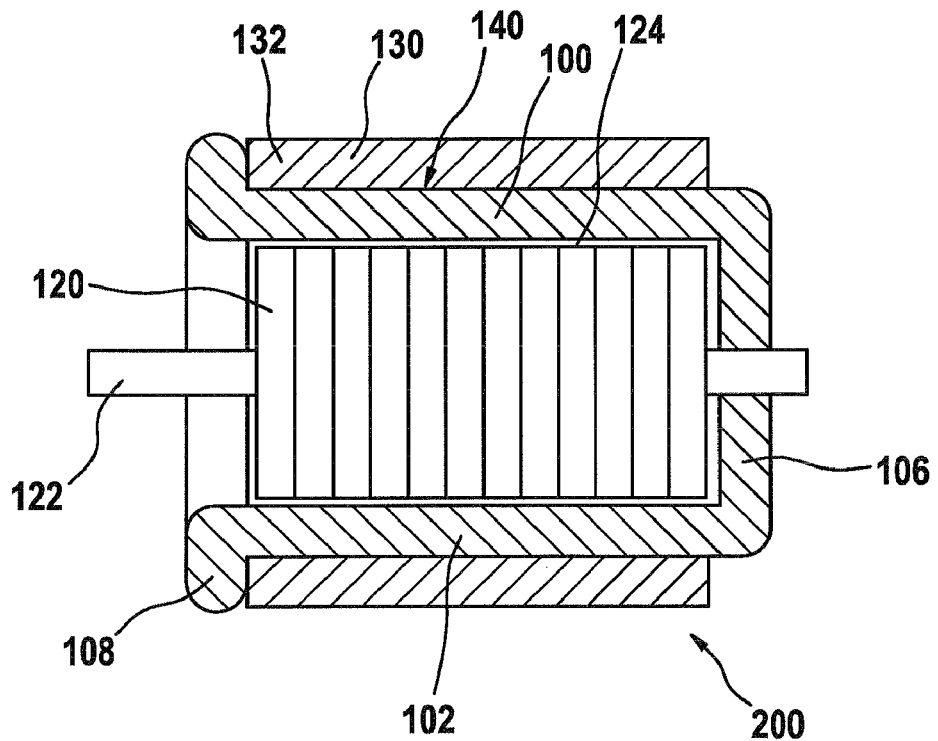
FIG. 3b is a longitudinal sectional view through a preferred electric motor.

FIGS. 3a and 3b show, as a cross section and a lateral longitudinal section view, respectively, a detailed view of a preferred electric motor 200 without an end shield, housing, cooling, or the like. The positions of coils 12, 14, 22, 24, 32, 34 are shown, as is a north pole N and a south pole S of a permanent magnet which is used as a rotor 120, is mounted directly on a rotor shaft 122, and is located in the interior of winding body 100. Coil sections 12 and 14, 22 and 24, 32 and 34 of particular winding phase 10, 20, 30 are each located diametrically opposite one another.

Rotor 120 comprises rotor shaft 122 and the permanent magnet which is mounted on rotor shaft 122 and which may be designed as a solid magnet, but which may also be composed of axially aligned rings, and is usually formed of a rare earth magnetic material, e.g., Nd—Fe—B alloys. Rotor shaft 122 is supported by ball bearings, although sliding bearings are also feasible.

Winding body 100 is located in an air gap 140 between a radially outer iron core 132 of a stator 130 and rotor 120, and it has an obvious pot-type shape as described above with reference to FIG. 1, reference to which is made in the further description of the details of winding body 100. Stator 130 includes stator iron core 132 and winding body 100. A mechanical air gap 124 is located between an inner contour of winding body 100 and rotor 120.

Preferred electric motor 200 is characterized by low inductance and high rotational speeds. Due to the method by which the winding is manufactured, the motor is particularly well-suited for use for a wide range of stator diameters, from approximately 20 mm to over 40 mm, and it may therefore be used in suitable manner for a large number of applications.

Figure 4A:
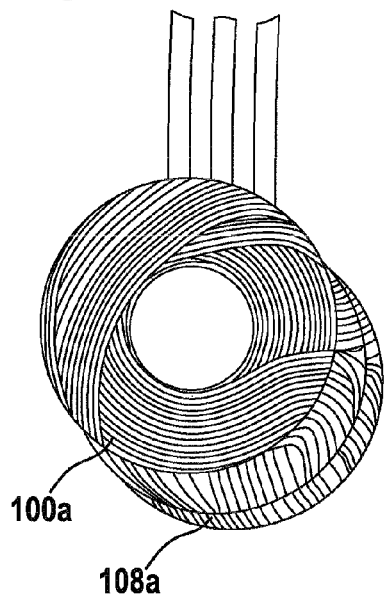
FIGS. 4a through 4d show various views of a conventional winding body (FIGS. 4a, 4c) and a preferred winding body (FIGS. 4b, 4d)
Figure 4B:
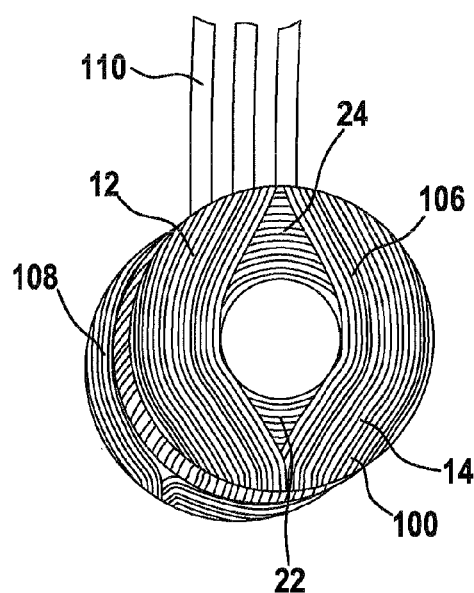
Figure 4C:
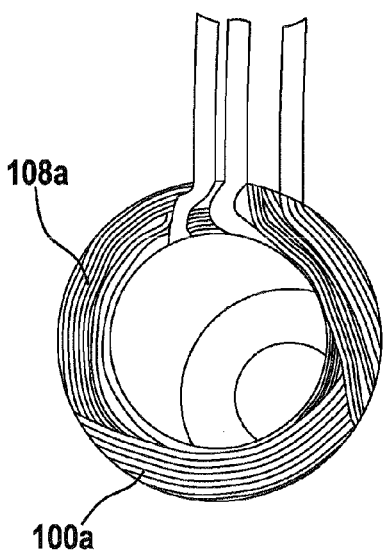
Figure 4D:
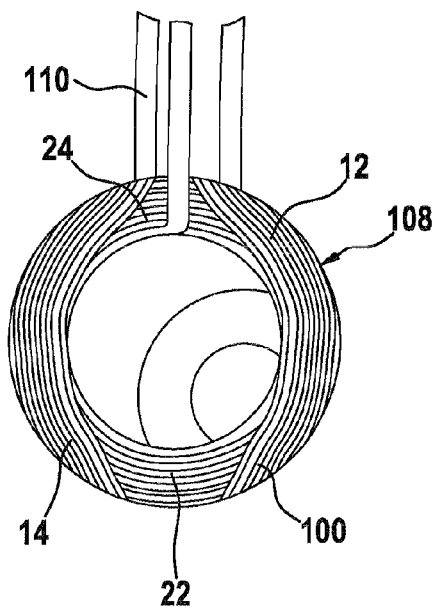

Coils 12, 14, 22, 24, 32, 34 of a winding phase 10, 20, 30 of winding body 100 are wound directly one after the other using a single litz wire. As a result, the position of the litz wires in winding body 100 described in FIGS. 1 and 2 changes, as shown in FIGS. 4a through 4d. FIG. 4a shows a conventionally wound winding body 100a in a view facing the bottom end, and FIG. 4c shows it in a view facing the expanded end including outwardly located winding overhang 108a, while FIG. 4b shows a preferred winding body 100 in a view facing bottom 106. FIG. 4d shows winding body 100 in a view facing its expanded end, including outwardly folded winding overhang 108.

According to a preferred method for manufacturing winding body 100, coils 12, 14 of first winding phase 10 are wound directly one after the other, followed by coils 22, 24 of second winding phase 20 and then coils 32, 34 of third winding phase 30 wound directly one after the other. The entire winding of winding body 100 is created using a single litz wire which remains continuous when transitioning from coil 12, 14 of first winding phase 10 to coil 22, 23 of second winding phase 20, and then to coils 32, 34 of third winding phase 30, and it is not cut during the winding process. The litz wire is guided out of the winding, at the respective coil ends, as a loop during the winding process. The loops are not cut until winding has been completed.

FIGS. 4b and 4d show clearly that coils 12, 14, 22, 24, 32, 34 of winding phases 10, 20, 30 are diametrically opposed. The outermost winding regions, e.g., coil 12 and coil 14 of first winding phase 10, therefore form the outside of winding overhang 106 which is located on the bottom and points inwardly. In this view, the regions are each shaped as approximate half moons. First coil 22 and second coil 24 of second winding phase 20 are shown therebetween; coils 32, 34 of third winding phase 30 are covered and undiscernable. The view at the other end of winding body 100 which includes outwardly folded winding overhang 108 is similar.

Figure 5:
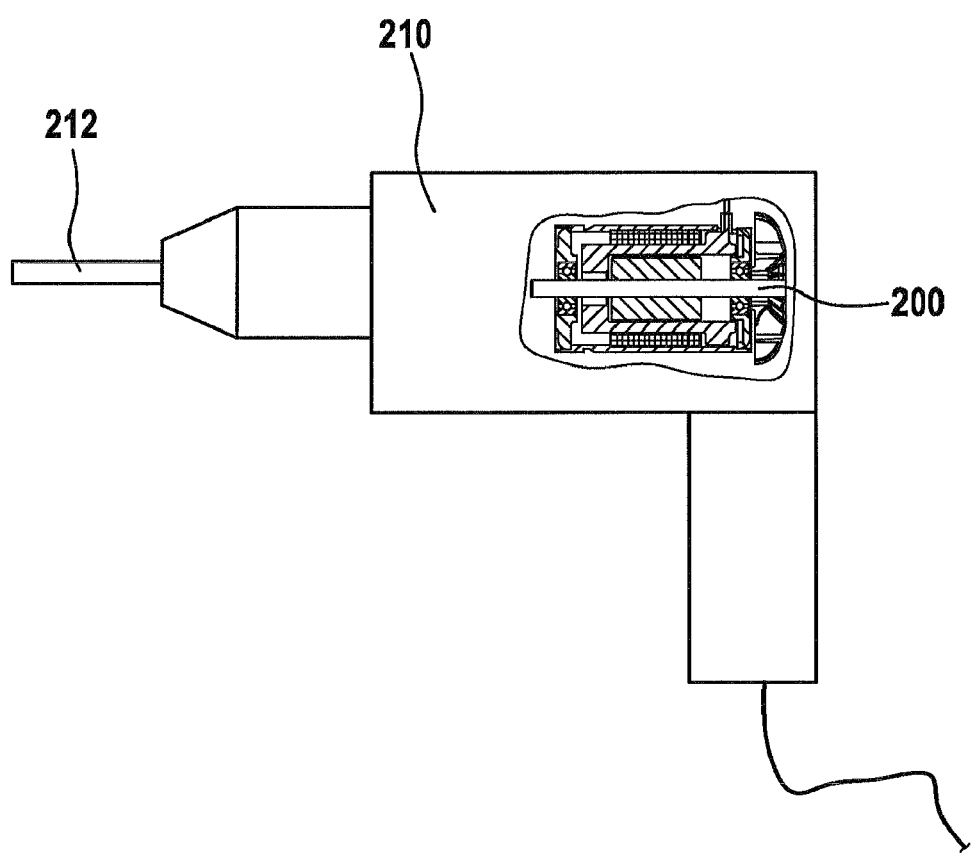
FIG. 5 shows a preferred power tool.

Finally, FIG. 5 shows a preferred power tool 210 for operation using a rechargeable battery or mains power, designed as a power tool having an insertion tool 212 that is driveable in a percussive and/or rotary manner. Power tool 210 includes a preferred electric motor 200 with an air-gap winding, which is equipped with a winding body 100 as described above with reference to FIGS. 1 through 3. Power tool 210 may be, in particular, a highly stressable power tool 210, such as an industrial screwdriver, a cordless screwdriver, or a rotary hammer.

Electric motor 200 is preferably wired using a delta connection. A BLDC motor requires a three-phase alternating current. In the case of a cordless power tool 210, the individual motor windings are controlled using a three-phase power converter. This replaces the mechanical commutator of the DC motor using permanent-magnet excitation.

What is claimed is:

1. A winding body for an electronically commutating electric motor (200) comprising an air-gap winding wherein at least two coils (12, 14; 22, 24; 32, 34) per winding phase (10, 20, 30) are provided, wherein the at least two coils (12, 14; 22, 24; 32, 34) of a winding phase (10; 20; 30) of the winding body (100) are wound directly one coil after the other coil, wherein the winding of the winding body is a continuous series connection, wherein the at least two coils (12, 14; 22, 24; 32, 34) per winding phase (10, 20, 30) are wound on a coil former which is removed after winding of the winding body (100) has been completed, wherein the entire winding of the winding body (100) is manufactured using a single litz wire which remains continuous when it transitions from the at least two coils (12, 14; 22, 24; 32, 34) of one winding phase (10; 20; 30) to the next at least two coils (12, 14; 22, 24; 32, 34) of the next winding phase (10; 20; 30), the litz wire being covered with a thermosetting varnish, wherein a winding overhang (106, 108) of the winding body (100) is folded on one axial end radially inwardly and on one axial end radially outwardly to form a pot-shaped winding body (100), wherein the winding body (100) is baked into a solid mass forming a self-supporting winding body (100); and wherein cutting the litz wire for creating the phase connections for the motor is not done until after winding of the winding body (100) is completed.

2. The winding body as recited in claim 1, wherein ends of the coils 12 14;22, 24; 32, 34) are guided out of the winding as loops during the winding process.

3. The winding body as recited in claim 1, wherein the litz wire is composed of several individual wires so that winding of the at least two coils (12, 14;

22, 24; 32, 34) is carried out in parallel.

4. A method for manufacturing a winding body (100) for an electronically commutating motor (200) comprising an air-gap winding, comprising:

providing at least two coils (12, 14; 22, 24; 32, 34) per winding phase (10, 20, 30);

winding the at least two coils (12, 14; 22, 24; 32, 34) of one winding phase (10; 20; 30) on a coil former directly one coil after the other coil before the at least two coils (12, 14; 22, 24; 32, 34) of another winding phase (10; 20; 30) are wound, the winding of the winding body being designed as a continuous series connection, and removing the coil former after winding of the winding body (100 has been completed;

manufacturing the entire winding of the winding body (100) using a single litz wire which remains continuous when it transitions from the at least two coils (12, 14; 22, 24; 32 34) of one winding phase (10; 20; 30) to the next at least two coils (12, 14; 22, 24; 32, 34) of the next winding phase (10; 20; 30), the litz wire being covered with a thermosetting varnish;

folding a winding overhang (106, 108) of the winding body (100) on one axial end radially inwardly and on one axial end radially outwardly for forming a pot-shaped wining body (100), baking the winding body (100) into a solid mass forming a self-supporting winding body (100), cutting the litz wire for creating the phase connections for the motor not until after winding of the winding body (100) is completed.

5. The method as recited in claim 4, wherein ends of the coils (12,14; 22, 24; 32, 34) are guided out of the winding as loops during the winding process.

6. An electric motor having a stator (120) and a rotor (130), the electric motor comprising a winding body (100) as recited in claim 1 wherein in the winding body (100) at least two coils (12, 14; 22, 24; 32, 34) per winding phase (10, 20, 30) are provided, wherein the winding of the winding body (100) is a continuous series connection, wherein the at least two coils (12, 14; 22, 24; 2, 34) per winding phase (10, 20, 30) are wound on a coil former which is removed after winding of the winding body (100) has been completed, wherein the at least two coils (12, 14; 22, 24; 32, 34) of one winding phase (10; 20; 30) are wound on the coil former directly one coil after the other coil before the at least two coils (12, 14; 22, 24; 32, 34) of another winding phase (10; 20; 30) are wound;

wherein the entire winding of the winding body (100) is manufactured using a single litz wire which remains continuous when it transitions from the at least two coils (12, 14; 22, 24; 32, 34) of one winding phase (10; 20; 30) to the next at least two coils (12, 14; 22, 24; 32, 34) of the next winding phase (10; 20; 30), the litz wire being covered with a thermosetting varnish, wherein a winding overhang (106, 108) of the winding body (100) is folded on one axial end radially inwardly and on one axial end radially outwardly, wherein the winding body (100) is based into a solid mass forming a self-supporting winding body (100), wherein cutting the litz wire for creating the phase connections for the motor is not done until after winding of the winding body (100) is completed, wherein the winding body (100) is electrically insulated by a wrapper material and the insulated winding body (100) is inserted into a stator core being composed of segmental rings stacked on top of one another in an axial direction, and wherein the stator (130) is fixed with the winding body (100).

7. A power tool including an insertion tool (212) that is driveable in a manner selected from a percussive manner, a rotary manner, or both, wherein it includes an electronically commutating electric motor (200) that comprises an air-gap winding, wherein a winding body (100) is located in an air gap (140) between a stator iron core (132) and a rotor (120), the winding body (100) having at least two coils (12, 14; 22, 24; 32, 34) per winding phase (10, 20, 30), the winding of the winding body (100) being a continuous series connection, wherein the at least two coils (12, 14; 22, 24; 32, 34) per winding phase (10, 20, 30) are wound on a coil former which is removed after winding of the winding body (100) has been completed, wherein the entire winding of the winding body (100) is manufactured using a single litz wire which remains continuous when it transitions from the at least two coils (12, 14; 22, 24; 32, 34) of one winding phase (10; 20; 30) to the next at least two coils (12, 14; 22, 24; 32, 34) of the next winding phase (10; 20; 30), the litz wire being covered with a thermosetting varnish, wherein a winding overhang (106, 108) of the winding body (100) is folded on one axial end radially inwardly and on one axial end radially outwardly to form a pot-shaped winding body (100), wherein the winding body (100) is baked into a solid mass forming a self-supporting winding body (100); and wherein cutting the litz wire for creating the phase connections for the motor is not done until after winding of the winding body (100) is completed.

8. The power tool as recited in claim 7, wherein the power tool (210) is operated using a rechargeable battery.

9. The winding body as recited in claim 1, wherein the at least two coils (12, 14; 22, 24; 32, 34) of each winding phase (10; 20; 30) are located diametrically opposite one another.

10. The electric motor as recited in claim 6, wherein the stator is fixed by trickling with an impregnating resin.

11. The electric motor as recited in claim 6, wherein the stator is fixed by providing the wrapper material as thermoset-varnish paper.

12. The electric motor as recited in claim 6, wherein the motor is wired using a delta connection.

13. The power tool as recited in claim 7, wherein the electronically commutating electric motor (200) is a BLDC motor.

* * * * *